Oct. 9, 1945.　　　K. A. BROWNE　　　2,386,291
EQUALIZING VALVE
Filed Jan. 29, 1943　　　2 Sheets-Sheet 1
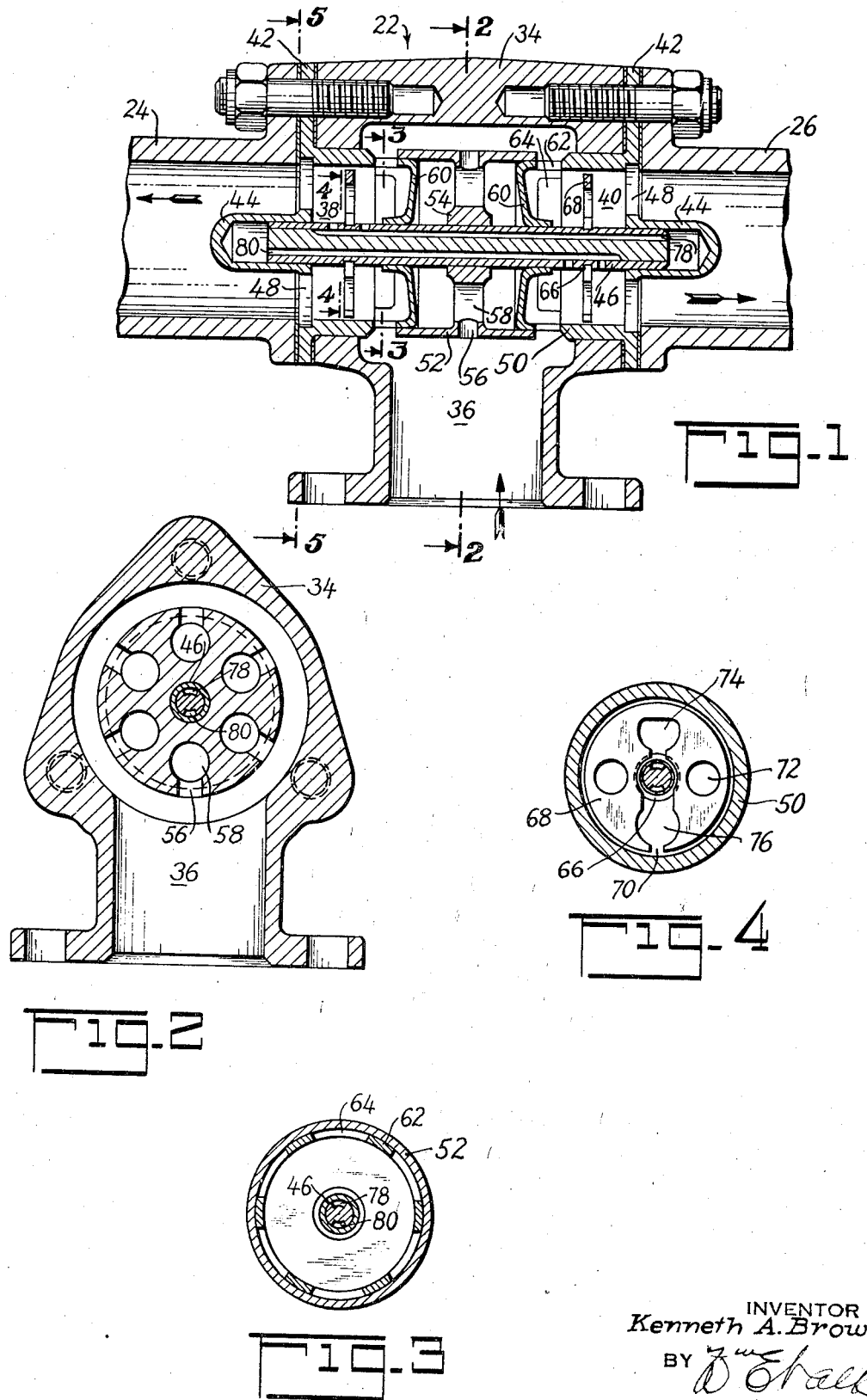
INVENTOR
Kenneth A. Browne.
BY
ATTORNEY Oct. 9, 1945.   K. A. BROWNE   2,386,291
EQUALIZING VALVE
Filed Jan. 29, 1943   2 Sheets-Sheet 2
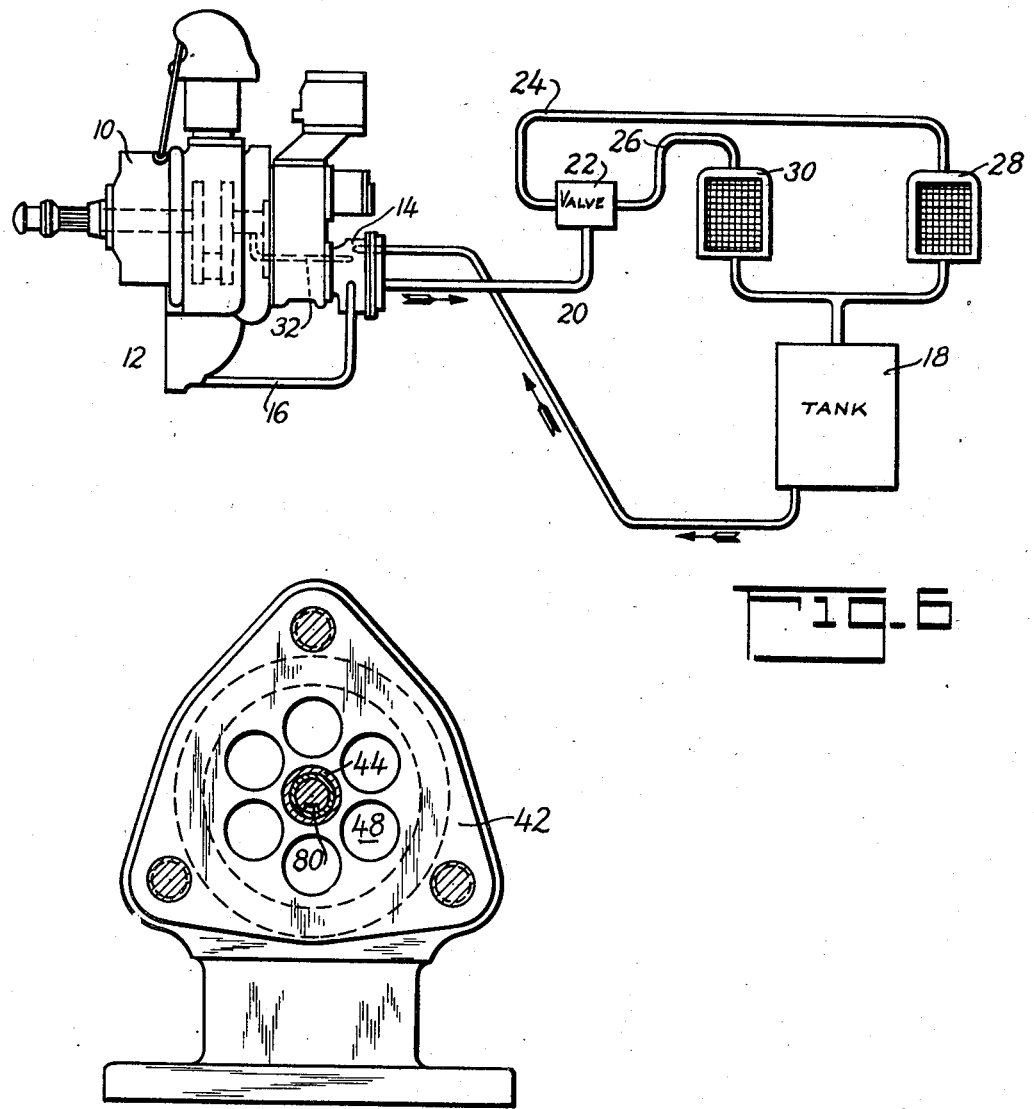
INVENTOR
Kenneth A. Browne.
BY
ATTORNEY Patented Oct. 9, 1945

2,386,291

UNITED STATES PATENT OFFICE 2,386,291

EQUALIZING VALVE

Kenneth A. Browne, Ridgewood, N. J., assignor to Wright Aeronautical Corporation, a corporation of New York Application January 29, 1943, Serial No. 474,019

9 Claims. (Cl. 137—166)

This invention in general relates to valves and is particularly directed to a flow dividing valve which is automatically operative to properly divide the fluid flow therethrough. As herein disclosed, this valve is used for properly dividing the oil flow between a pair of parallel connected oil coolers forming part of an internal combustion engine lubrication system. However, it should be understood that the valve is of general application and may be used wherever it is desired to divide a fluid flow between two branch conduits and to maintain a particular proportion of the flow in each conduit.

In connection with the lubrication system of an aircraft engine, it is conventional practice to pump the return oil through a cooling radiator before the oil is returned to the supply reservoir. In order to increase the amount of cooling it is proposed to use two such coolers. If the two coolers are placed in series, the necessary fluid pressure drop through the cooler structure is doubled while if the two coolers are placed in parallel, the necessary pressure drop to effect proper flow is cut in half. Accordingly, the parallel arrangement of the cooling radiators is much more practical from the standpoint of satisfactory scavenging of the oil from the engine. However, ordinarily two parallel connected coolers will not divide the flow at all. As soon as the flow through one of the coolers decreases slightly, this cooler will provide increased cooling for the remaining oil circulating therethrough thereby increasing the viscosity of the oil in the cooler and further reducing the flow therethrough. Accordingly, with two such coolers connected in parallel, ultimately the entire oil flow will be through one cooler while the oil will tend to congeal in the other cooler. It is an object of this invention to provide a flow dividing valve which is automatically operative to maintain substantially equal flow through two parallel connected coolers. It is a further object of this invention to provide a fluid flow dividing valve which is automatically operative to divide the flow into two branch conduits and to maintain a particular proportion of the flow in each conduit. Another object of the invention is to provide a simplified sleeve valve construction.

Specifically, the automatic valve of this invention comprises a freely floating balanced valve element operative to throttle the oil flow into either one or the other of two oil lines and which element is positioned by opposed forces created by the flow in each oil line.

Other objects of the invention will become apparent in reading the annexed detailed description in connection with the drawings, in which:

Fig. 1 is a longitudinal section through the valve;

Figs. 2 to 5 are sectional views on the lines 2—2, 3—3, 4—4 and 5—5 respectively of Fig. 1; and Fig. 6 is a schematic view illustrating an application of the valve to a lubrication system of an internal combustion engine.

Referring first to Fig. 6, a conventional aircraft engine is illustrated at 10 and is provided with an oil sump 12 and an oil pump unit 14. The pump unit 14 comprises a scavenging pump and a delivery pump. The scavenging pump draws the excess oil from the sump 12 through a line 16 and returns this oil to the supply tank 18 through a line 20, valve 22, lines 24 and 26 and a pair of parallel connected coolers 28 and 30. From the supply tank 18 the delivery pump of the unit 14 delivers the oil through passages such as 32 to the parts of the engine to be lubricated.

In the absence of valve 22 the oil flow will not divide evenly between the coolers 28 and 30, in fact, eventually all the oil will flow through one cooler. This is so because as soon as there is any decrease in the oil flow through any one cooler, the oil flowing through this one cooler will be further cooled thereby increasing the viscosity of the oil in this one cooler and further reducing the flow therethrough. Thus ultimately all the oil will flow through the other cooler. However, in accordance with this invention, upon a decrease in flow through any one of the coolers, the valve 22 is automatically operative to throttle the flow to the other cooler thereby maintaining substantially equal flow through both coolers.

Referring now to Figs. 1 to 5, the valve 22 comprises a housing 34 having a symmetrically disposed inlet port 36 and a pair of oppositely directed outlet ports 38 and 40 opening into lines 24 and 26 respectively. A pair of spider members 42 are secured across the outlet ends of the housing 34. The hub 44 of each spider member slidably receives the ends of the valve stem 46. The remote ends of the hubs 44 are closed so that each hub and the associated end of the stem received therein constitutes a piston-cylinder assembly. A plurality of openings 48 are provided in the spider members 42 about the hub 44 to permit fluid flow through the outlet ports. Also each of the spider members is provided with an inwardly directed cylindrical valve seat portion 50 fitted to the valve housing about the outlet ports. The movable valve element comprises the valve stem portion 46 the ends of which are piloted within the tubular hubs 44 and a hollow sleeve portion 52 secured to the stem by a web 54. Openings 56 and 58 within the valve sleeve and web respectively permit the transmission of inlet fluid pressure into the valve sleeve.

Slidably mounted on the valve stem are a pair of valve heads 60. Each of the valve heads 60 comprises a stamping formed with axially extending fingers 62 having valve port openings 64 therebetween. The finger elements 62 are in alignment with the adjacent cylindrical valve seat portion 50. The valve sleeve 52 extends between and is adapted to slide over the valve heads 60 and the associated valve port openings 64. Thus, the valve sleeve 52 is movable to throttle the flow through either of the outlet ports. In view of the pressure drop through the valve ports 64, the pressure on the inlet side of the valve head 60 exceeds the pressure on the outlet side thereby maintaining the fingers 62 of each valve head against the cylindrical valve seat structure 50. This construction of the valve heads greatly simplifies the mechanical construction of the valve casting.

Each end of the valve stem 46 is provided with an annular groove 66 about which a split baffle element 68 is sprung, as best seen in Fig. 4. Each of these baffle elements is split at 70 and is provided with symmetrically disposed openings 72, 74 and 76 for fluid flow therethrough. These washer type baffles provide a slight restriction to the flow through each outlet so that each baffle exerts a force on the valve stem in the direction of and in proportion to the magnitude of the flow through each outlet. Accordingly, with equal flow through the outlet ports the baffles will exert equal but opposed forces on the valve stem to balance the valve. Now, if the flow through outlet port 38 decreases for some reason, the leftward force exerted by the associated baffle 68 on the valve stem will decrease by a corresponding amount. Accordingly, the forces on the valve stem exerted by the baffle elements will be unbalanced and will move the stem to the right to reduce the flow through outlet port 40 to again balance the valve and to thereby restore equal division of flow through the outlet ports. A reduction in flow through outlet port 40 results in a similar but opposite movement of the valve element.

Now, as previously described, each valve head 60 is urged against its associated valve seat portion 50 by a force equal to the difference between the inlet fluid pressure and the associated outlet fluid pressure. Therefore, there always is some fluid leakage between the valve head and the valve sleeve stem. This leakage around the valve head would subject the sleeve and stem to a frictional drag in the direction of the leakage. In the central position of the valve, as illustrated in Fig. 1, the leakage past each valve head is relatively small and each such leakage exerts an equal but opposite frictional drag on the valve and therefore will have no resultant effect. However, when the valve is displaced, for example to the left, then momentarily at least there is a greater pressure drop through the lefthand valve port 64. Accordingly, there now is more leakage of fluid from the inside of the valve sleeve 52 around the lefthand valve head 60 into the outlet port 38. This differential leakage results in a resultant frictional drag of the valve stem and sleeve to the left. In order to overcome this resultant frictional drag, the valve stem is provided with passageways 78 and 80 extending from communication with outlet ports 38 and 40 respectively, to the opposed ends of the valve stem. Thus, the ends of the valve stem are subjected to opposed forces proportional to the discharge pressures in the opposed outlet ports.

With this construction, if the flow decreases through outlet port 40, the baffles 68 are operative to move the valve sleeve 52 to the left thereby throttling the flow through the lefthand valve ports 64. This results in a larger pressure drop through the lefthand valve ports thereby increasing the leakage around the lefthand valve head 60 and providing a frictional drag further urging the valve to the left. However, the lefthand end of the valve stem 46 is subjected to the larger discharge pressure in outlet 40 while the righthand end of the stem is subjected to the smaller discharge pressure in outlet 38. This differential pressure tends to urge the stem to the right. Since this latter pressure differential and the increased frictional drag about one of the valve heads 60 are both proportional to the increased throttling through one of the sets of valve ports 64, these two factors can be so designed as to balance each other. In other words, when the valve is displaced in either direction the small piston areas at the ends of the valve stem subject the valve stem to a force balancing the increased frictional drag as caused by leakage around one of the valve heads.

As above described, the valve 22 is automatically operative to maintain substantially equal division of flow in the lines 24 and 26. Except for the differential pressure to balance the leakage frictional drag on the movable elements of the valve, the valve does not have any piston area subjected to the difference in pressure between the outlet lines. In the above construction the baffles 68 act as a slight restriction to the fluid flow through each outlet thereby subjecting the movable valve element to a pair of opposed forces each proportional to the magnitude of the fluid flow through one of the outlet ports. In other words, the valve is positioned only by equalizing forces created by the flow in each branch conduit so that the valve is stable in all positions.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a valve structure, a valve housing having a fluid inlet port and a pair of opposed outlet ports, a valve stem extending between said outlet ports and having each of its ends slidably fitted in a closed cylinder, a valve element mounted on said stem for controlling the division of flow through said outlet ports, a pair of baffle elements each mounted on said stem in respective outlet ports, and fluid passageways connecting each of said cylinders with the opposite outlet port.

2. In a valve structure, a valve housing having a substantially cylindrical bore therethrough, a fluid inlet port opening transversely into said bore, a pair of fluid outlet ports at opposed ends of said bore, a valve stem coaxially disposed within said bore and having each of its ends slidably fitted through one end of a pair of opposed closed cylinders, a pair of cup-shaped valve seat means within said bore having their closed ends facing each other, each of said valve seat means having a plurality of circumferentially disposed valve ports opening into respective outlet ports, said valve stem extending slidably through the closed ends of said valve seat means and supporting a valve sleeve therebetween, said valve sleeve being slidably fitted over each valve seat means to control the fluid flow through the outlet ports, and a pair of baffle elements mounted on said valve stem at respective outlet ports.

3. In a valve structure, a valve housing having a substantially cylindrical bore therethrough, a fluid inlet port opening transversely into said bore, a valve stem coaxially disposed within said bore and having each of its ends slidably fitted through one end of a pair of opposed closed cylinders, a pair of cylindrical valve seats within and at opposite ends of said bore and surrounding said valve stem to define a pair of outlet ports therebetween, a pair of valve head elements slidably mounted on the valve stem and each having a cylindrical portion in alinement with and adapted to engage one of said valve seats, a plurality of circumferentially disposed valve ports between each valve head element and valve seat and opening into the associated outlet port, a valve sleeve element concentric with and secured to said valve stem and extending between and over each of the valve head elements toward the respective valve seats whereby movement of the valve sleeve controls the fluid flow through the outlet ports, said sleeve being hollow and open to the fluid inlet pressure whereby said inlet pressure holds the valve head elements against their respective seats, a pair of baffle elements mounted on said valve stem at respective outlet ports, and fluid passageways extending from each end of and through the valve stem into communication with the opposed outlet ports.

4. In a valve structure, a valve housing having a fluid inlet port and a pair of outlet ports, slide valve means for controlling the division of flow between said ports, means responsive to the fluid flow through one of said outlet ports for urging said valve means in a direction for reducing the flow through said one port, means responsive to the flow through the other outlet port for urging said valve means in a direction for reducing the flow through said other port, and means responsive to the pressure differential between the outlet ports for urging the valve means in a direction to reduce the flow to the outlet having the higher pressure.

5. In a valve structure, a valve housing having a bore therethrough defining a pair of outlet ports at its ends, a fluid inlet port opening into said bore at a point intermediate the ends of said bore, one or more valve port openings establishing communication between said inlet port and each of said outlet ports, a valve member within said inlet port and slidable over said valve port openings for controlling the division of fluid flow from said inlet port to said outlet ports, means responsive to the fluid flow through one of said outlet ports for urging the valve member in a direction for reducing the flow through said one outlet port, and means responsive to the fluid flow through the other of said outlet ports for urging the valve member in a direction for reducing the flow through said other outlet port.

6. In a valve structure, a valve housing having a bore therethrough defining a pair of outlet ports at its ends, a fluid inlet port opening transversely into said bore at an intermediate point therealong, a pair of cup-shaped valve seat means disposed in said bore on opposite sides of said intermediate point with their closed ends facing each other, each of said valve seat means having one or more valve port openings through their sides, a valve sleeve slidable over said cup-shaped valve seat means for controlling the division of fluid flow from said fluid inlet port through said valve port openings to said fluid outlet ports, a valve stem extending through the closed ends of said valve seat means and carrying said valve sleeve, and means mounted adjacent each end of said valve stem responsive to the fluid flow through the adjacent outlet port for urging said valve sleeve in a direction for reducing the flow through said adjacent port.

7. In a valve structure, a valve housing having a bore therethrough defining a pair of outlet ports at its ends, a fluid inlet port opening into said bore at a point intermediate the ends of said bore, a relative small cylinder supported within each outlet port having their remote ends closed, a valve stem extending between said outlet ports and having each of its opposed ends slidably received in one of said closed cylinders, a valve element mounted on said stem for controlling the division of flow through said outlet ports, a first member secured to said valve stem and responsive to the fluid flow through one of said outlet ports for urging said valve element in a direction to reduce the flow through said one port, and a second member secured to said valve stem and responsive to the fluid flow through the other of said outlet ports for urging said valve element in a direction to reduce the flow through said other port.

8. In a valve structure, a valve stem, a sleeve valve element carried by said stem, and cylindrical valve seat means surrounding said stem and having one or more valve openings therethrough, said sleeve valve element being slidable over said valve seat means to control said valve openings, said valve seat means comprising a fixed main member and a head member closing one end of said cylindrical valve seat means, the other end of said valve seat means providing a valve outlet port, said head member being slidably mounted on said valve stem and being exposed to the valve fluid inlet pressure for holding said head member against said main member.

9. In a valve structure, a valve stem, a sleeve valve element carried by said stem, and cylindrical valve seat means surrounding said stem comprising a fixed main cylindrical member and a head member slidably mounted on said stem and closing one end of said cylindrical valve seat means, the other end of said cylindrical valve seat means comprising a valve outlet port, said main member and said head member having mutually engageable end surfaces and said head member being urged into engagement with said main member by the valve fluid inlet pressure, at least one of said members being notched along its engaging end surface to provide valve openings and said sleeve valve element being slidable over said cylindrical valve seat means to control said valve openings.

KENNETH A. BROWNE.